US007080045B1

(12) United States Patent
Sako

(10) Patent No.: US 7,080,045 B1
(45) Date of Patent: Jul. 18, 2006

(54) ELECTRONIC REVENUE STAMP ISSUING APPARATUS AND METHOD THEREOF AND RECORDING MEDIUM STORED CONTROL PROGRAM THEREOF

(75) Inventor: Kazue Sako, Tokyo (JP)

(73) Assignee: NEC Corporation, Tokyo (JP)

( * ) Notice: Subject to any disclaimer, the term of this patent is extended or adjusted under 35 U.S.C. 154(b) by 108 days.

(21) Appl. No.: 09/710,306

(22) Filed: Nov. 9, 2000

(30) Foreign Application Priority Data

Nov. 10, 1999 (JP) ................................. 11-318982

(51) Int. Cl.
*G06F 17/60* (2006.01)
*H04K 1/00* (2006.01)
*G07F 17/02* (2006.01)

(52) U.S. Cl. ............................ 705/60; 705/61; 705/62; 705/401; 705/402; 705/410; 235/71; 235/101

(58) Field of Classification Search ........ 705/401–411, 705/40, 60–62; 235/71, 101
See application file for complete search history.

(56) References Cited

U.S. PATENT DOCUMENTS

| 4,649,266 | A | * | 3/1987 | Eckert | ........................ | 235/432 |
| 4,757,187 | A | * | 7/1988 | Millet | .......................... | 705/62 |
| 4,760,534 | A | * | 7/1988 | Fougere et al. | ............. | 705/406 |
| 4,831,555 | A | * | 5/1989 | Sansone et al. | ............ | 358/1.14 |
| 5,319,562 | A | * | 6/1994 | Whitehouse | ................ | 705/403 |
| 5,726,894 | A | * | 3/1998 | Sansone | ..................... | 705/408 |
| 5,768,132 | A | * | 6/1998 | Cordery et al. | ............. | 705/410 |
| 5,999,967 | A | * | 12/1999 | Sundsted | ..................... | 709/206 |
| 6,058,384 | A | * | 5/2000 | Pierce et al. | ................... | 705/50 |

(Continued)

FOREIGN PATENT DOCUMENTS

JP         63-280370         11/1988

(Continued)

*Primary Examiner*—Kambiz Abdi
(74) *Attorney, Agent, or Firm*—Scully, Scott, Murphy & Presser, P.C.

(57) ABSTRACT

An electronic revenue stamp issuing apparatus and a method thereof and a recording medium stored a control program thereof, in which the amount of an electronic revenue stamp that became invalid can be used again as a possible amount to issue without any communication with a specified communication center, are provided. The electronic revenue stamp issuing apparatus provides a judging means for judging whether the amount of an electronic revenue stamp to be issued is equal to or less than a possible amount to issue in which a prepaid amount is stored or not, an issuing means for issuing the electronic revenue stamp as data attached a signature of the electronic revenue stamp issuing apparatus to a message to be attached to the electronic revenue stamp, the amount of the electronic revenue stamp, and an identifier of a receiver of the electronic revenue stamp, in case that the amount of the electronic revenue stamp is equal to or less than the possible amount to issue, a balance amount reducing means for reducing the amount of the electronic revenue stamp from the possible amount to issue, when the electronic revenue stamp was issued, a verifying means, when the verifying means receives a certificate making electronic revenue stamp invalid attached a signature of the receiver, verifies whether the certificate making electronic revenue stamp invalid is valid or not by using the identifier of the receiver and the signature of the electronic revenue stamp issuing apparatus, an amount increasing means for increasing the possible amount to issue by the amount of the electronic revenue stamp made to be invalid, and an invalid electronic revenue stamp recording means for recording the certificate making electronic revenue stamp invalid that was made to be invalid.

19 Claims, 3 Drawing Sheets

U.S. PATENT DOCUMENTS

| | | | | |
|---|---|---|---|---|
| 6,085,181 A * | 7/2000 | Gravell et al. | ............... | 705/408 |
| 6,175,827 B1 * | 1/2001 | Cordery et al. | ............. | 705/410 |
| 6,205,373 B1 * | 3/2001 | Hart et al. | .................. | 700/222 |
| 6,260,028 B1 * | 7/2001 | Lee et al. | .................... | 705/401 |
| 6,285,990 B1 * | 9/2001 | Lee et al. | ...................... | 705/60 |
| 6,349,292 B1 * | 2/2002 | Sutherland et al. | ............ | 705/62 |
| 6,385,731 B1 * | 5/2002 | Ananda | ...................... | 713/202 |
| 6,427,139 B1 * | 7/2002 | Pierce | ......................... | 705/60 |
| 6,438,529 B1 * | 8/2002 | Thiel | ........................... | 705/62 |
| 6,438,530 B1 * | 8/2002 | Heiden et al. | .............. | 705/401 |

FOREIGN PATENT DOCUMENTS

| | | |
|---|---|---|
| JP | 10-171887 | 6/1998 |
| JP | 11-203371 | 7/1999 |
| WO | WO 97/40472 | * 10/1997 |

* cited by examiner

F I G. 2
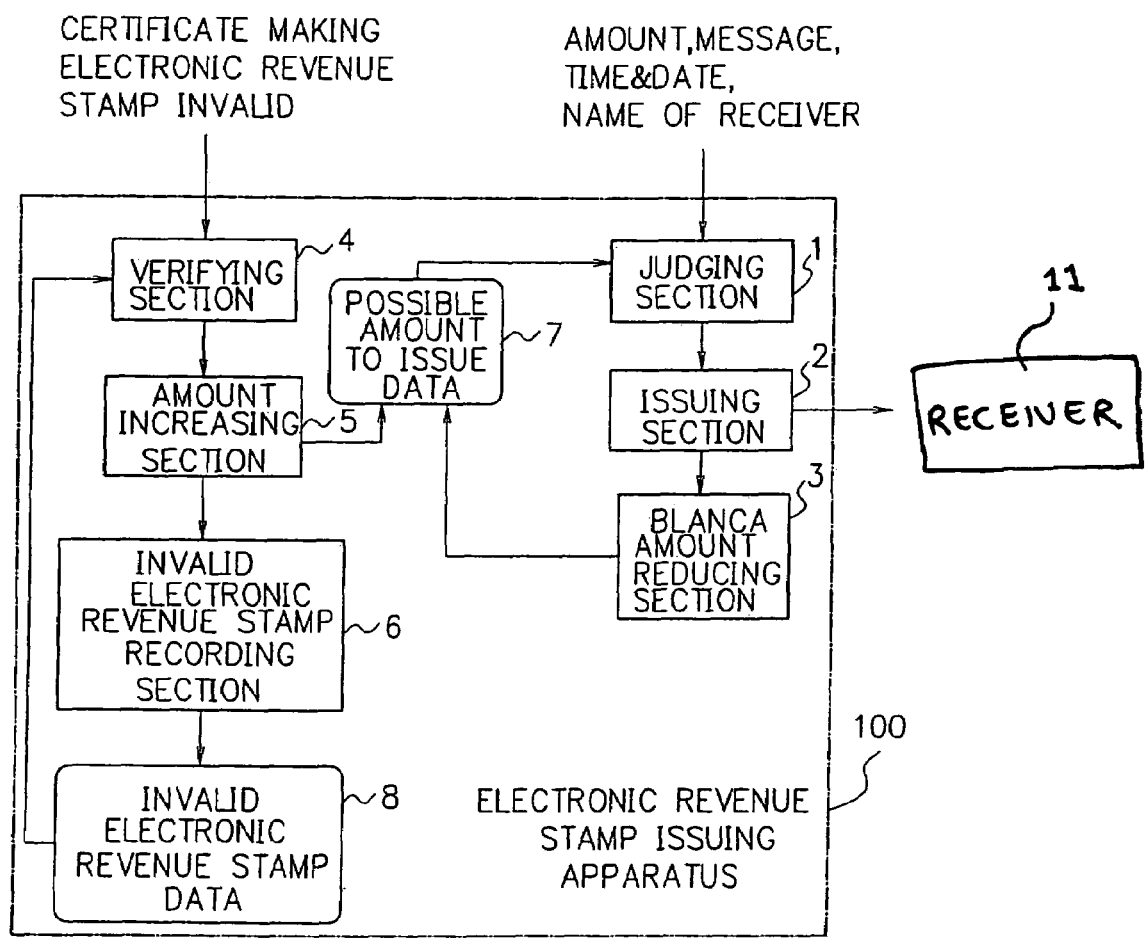

ELECTRONIC REVENUE STAMP ISSUING APPARATUS AND METHOD THEREOF AND RECORDING MEDIUM STORED CONTROL PROGRAM THEREOF

BACKGROUND OF THE INVENTION

The present invention relates to an electronic revenue stamp issuing apparatus and a method thereof and a recording medium stored a control program thereof, in particular, in which an electronic revenue stamp attached a message is issued to certificate that a fee or a tax was paid.

DESCRIPTION OF THE RELATED ART

A conventional electronic revenue stamp system is described in a technical report "Design of electronic revenue stamp system", 1999, pp. 389–394, written by A. Shimbo et al., for the 1999 symposium on cryptography and information security organized by the Institute of Electronics, Information and Communication Engineers. In this technical report, the electronic revenue stamp issuing apparatus provides a secret key for an electronic digital signature. And the electronic revenue stamp is data that a signature of the electronic revenue stamp issuing apparatus is attached to inputted data such as a message, an amount to be attached, a time & date of an applicant.

FIG. 1 is a block diagram showing a conventional electronic revenue stamp issuing apparatus. Referring to FIG. 1, a conventional electronic revenue stamp issuing apparatus 200 is explained. The conventional revenue stamp issuing apparatus 200 controls a possible amount to issue data 7, and provides a judging section 1 which judges whether an inputted amount can be issued or not by using data from the possible amount to issue data 7 when an application is inputted data, an issuing section 2 which attaches a signature of the electronic revenue stamp issuing apparatus 200 to inputted data such as a message, an amount to be attached, and a time & date, and a balance amount reducing section 3 which reduces the amount of the issued electronic revenue stamp from the possible amount to issue data 7.

The inputting data to this conventional electronic revenue stamp issuing apparatus 200 are the amount of the electronic revenue stamp, the message, and the time & date. The inputted data being the amount of the electronic revenue stamp, the message, and the time & date at the time of the application are outputted to the judging section 1. The judging section 1 judges whether the inputted amount of the electronic revenue stamp is equal to or less than the possible amount to issue data 7 or not. When the amount of the electronic revenue stamp applied this time is equal to or less than the possible amount to issue data 7, the inputted data are outputted to the issuing section 2. The issuing section 2 calculates a signature by using a secret key for signature (not shown) recorded in the electronic revenue stamp issuing apparatus 200 for the inputted data, and outputs data attached with the signature as an electronic revenue stamp. When the electronic revenue stamp was issued, the balance amount reducing section 3 reduces the issued amount of the electronic revenue stamp from the possible amount to issue data 7. With this operation mentioned above, the electronic revenue stamp issuing operation is completed.

At the conventional electronic revenue stamp issuing apparatus 200, in order to prevent making the possible amount to issue data 7 increase by illegal operation, the possible amount to issue data 7 can not be increased except that the conventional electronic revenue stamp issuing apparatus 200 communicates with a specified communication center. On the other hand, the electronic revenue stamp is issued by depending on the applied message, therefore, when the message is revised, the electronic revenue stamp attached to the original message becomes invalid. If the amount of the electronic revenue stamp, which became invalid, can be inputted again to the possible amount to issue data 7, the possible amount to issue data 7 can be increased. This is very useful for the electronic revenue stamp issuing apparatus 200. However, as mentioned above, at the conventional electronic revenue stamp issuing apparatus 200, there is no means to increase the possible amount to issue data 7 except that the electronic revenue stamp issuing apparatus 200 communicates with the specified communication center. In an application by a paper base, only the message can be revised without making the revenue stamp invalid, therefore, this problem is a big disadvantage at the electronic revenue stamp issuing.

SUMMARY OF THE INVENTION

It is therefore an object of the present invention to provide an electronic revenue stamp issuing apparatus and a method thereof and a recording medium stored a control program thereof, in which the amount of an electronic revenue stamp that became invalid can be used again as a possible amount to issue without any communication with a specified communication center.

According to a first aspect of the present invention for achieving the object mentioned above, there is provided an electronic revenue stamp issuing apparatus. The electronic revenue stamp issuing apparatus provides a judging means for judging whether the amount of an electronic revenue stamp to be issued is equal to or less than a possible amount to issue in which a prepaid amount is stored or not, an issuing means for issuing the electronic revenue stamp as data attached a signature of the electronic revenue stamp issuing apparatus to a message to be attached to the electronic revenue stamp, the amount of the electronic revenue stamp, and an identifier of a receiver of the electronic revenue stamp, in case that the amount of the electronic revenue stamp is equal to or less than the possible amount to issue, and a balance amount reducing means for reducing the amount of the electronic revenue stamp from the possible amount to issue, when the electronic revenue stamp was issued.

According to a second aspect of the present invention, in the first aspect, the electronic revenue stamp issuing apparatus further provides a verifying means, when the verifying means receives a certificate making electronic revenue stamp invalid attached a signature of the receiver, verifies whether the certificate making electronic revenue stamp invalid is valid or not by using the identifier of the receiver, an amount increasing means for increasing the possible amount to issue by the amount of the electronic revenue stamp made to be invalid, and an invalid electronic revenue stamp recording means for recording the certificate making electronic revenue stamp invalid that was made to be invalid.

According to a third aspect of the present invention, in the first aspect, the issuing means issues the electronic revenue stamp as data attached the signature of the electronic revenue stamp issuing apparatus to an issued number (a serial number) of the electronic revenue stamp issuing apparatus to specify the electronic revenue stamp, in addition to the message to be attached to the electronic revenue stamp, the amount of the electronic revenue stamp, and the identifier of the receiver of the electronic revenue stamp.

According to a fourth aspect of the present invention, in the second aspect, the verifying means, when the verifying means receives the certificate making electronic revenue stamp invalid attached the signature of the receiver, verifies whether the certificate making electronic revenue stamp invalid is valid or not by using the identifier of the receiver and an issued number (a serial number) of the electronic revenue stamp issuing apparatus, when the electronic revenue stamp issuing apparatus gives the issued number to the electronic revenue stamp.

According to a fifth aspect of the present invention, in the second aspect, the electronic revenue stamp issuing apparatus further provides invalid electronic revenue stamp data in which data of electronic revenue stamps made to be invalid are stored.

According to a sixth aspect of the present invention, in the first aspect, the electronic revenue stamp issuing apparatus further provides an issued electronic revenue stamp recording means which records issued electronic revenue stamps, and issued electronic revenue stamp and invalid electronic revenue stamp data in which data of the issued electronic revenue stamp data and electronic revenue stamps made to be invalid are stored when the electronic revenue stamps are made to be invalid.

According to a seventh aspect of the present invention, in the second aspect, the verifying means verifies that the certificate making electronic revenue stamp invalid is issued for an electronic revenue stamp issued by the electronic revenue stamp issuing apparatus and also issued by a receiver who is an valid receiver of the electronic revenue stamp, and also verifies that the certificate making electronic revenue stamp invalid was not used before.

According to an eighth aspect of the present invention, there is provided an electronic revenue stamp issuing method. The electronic revenue stamp issuing method provides the steps of, judging whether the amount of an electronic revenue stamp to be issued is equal to or less than a possible amount to issue in which a prepaid amount is stored or not, issuing the electronic revenue stamp as data attached a signature of an electronic revenue stamp issuing apparatus to a message to be attached to the electronic revenue stamp, the amount of the electronic revenue stamp, and an identifier of a receiver of the electronic revenue stamp, in case that the amount of the electronic revenue stamp is equal to or less than the possible amount to issue, and reducing the amount of the electronic revenue stamp from the possible amount to issue, when the electronic revenue stamp was issued.

According to a ninth aspect of the present invention, in the eighth aspect of the present invention, the electronic revenue stamp issuing method further provides the steps of; when a certificate making electronic revenue stamp invalid attached a signature of the receiver is received, verifying whether the certificate making electronic revenue stamp invalid is valid or not by using the identifier of the receiver, increasing the possible amount to issue by the amount of the electronic revenue stamp made to be invalid, and recording the certificate making electronic revenue stamp invalid that was made to be invalid.

According to a tenth aspect of the present invention, in the eighth aspect, the issuing step issues the electronic revenue stamp as data attached the signature of the electronic revenue stamp issuing apparatus to an issued number (a serial number) of the electronic revenue stamp issuing apparatus to specify the electronic revenue stamp, in addition to the message to be attached to the electronic revenue stamp, the amount of the electronic revenue stamp, and the identifier of the receiver of the electronic revenue stamp.

According to an eleventh aspect of the present invention, in the ninth aspect, the verifying step, when the verifying step receives the certificate making electronic revenue stamp invalid attached the signature of the receiver, verifies whether the certificate making electronic revenue stamp invalid is valid or not by using the identifier of the receiver and an issued number (a serial number) of the electronic revenue stamp issuing apparatus, when the electronic revenue stamp issuing apparatus gives the issued number to the electronic revenue stamp.

According to a twelfth aspect of the present invention, in the ninth aspect, the electronic revenue stamp issuing method further provides the step of; storing invalid electronic revenue stamp data that are data of electronic revenue stamps made to be invalid.

According to a thirteenth aspect of the present invention, in the eighth aspect, the electronic revenue stamp issuing method further provides the steps of; recording issued electronic revenue stamps, and storing issued electronic revenue stamp data and invalid electronic revenue stamp data made to be invalid when the electronic revenue stamps are made to be invalid.

According to fourteenth aspect of the present invention, in the ninth aspect, the verifying step verifies that the certificate making electronic revenue stamp invalid is issued for an electronic revenue stamp issued by the electronic revenue stamp issuing apparatus and also issued by a receiver who is an valid receiver of the electronic revenue stamp, and also verifies that the certificate making electronic revenue stamp invalid was not used before.

According to a fifteenth aspect of the present invention, there is provided a recording medium stored a control program of an electronic revenue stamp issuing method. The recording medium stored the control program of the electronic revenue stamp issuing method provides the steps of; judging whether the amount of an electronic revenue stamp to be issued is equal to or less than a possible amount to issue in which a prepaid amount is stored or not, issuing the electronic revenue stamp as data attached a signature of an electronic revenue stamp issuing apparatus to a message to be attached to the electronic revenue stamp, the amount of the electronic revenue stamp, and an identifier of a receiver of the electronic revenue stamp, in case that the amount of the electronic revenue stamp is equal to or less than the possible amount to issue, and reducing the amount of the electronic revenue stamp from the possible amount to issue, when the electronic revenue stamp was issued.

According to a sixteenth aspect of the present invention, in the fifteenth aspect, the recording medium stored the control program of the electronic revenue stamp issuing method further provides the steps of; when a certificate making electronic revenue stamp invalid attached a signature of the receiver is received, verifying whether the certificate making electronic revenue stamp invalid is valid or not by using the identifier of the receiver, increasing the possible amount to issue by the amount of the electronic revenue stamp made to be invalid, and recording the certificate making electronic revenue stamp invalid that was made to be invalid.

According to a seventeenth aspect of the present invention, in the fifteenth aspect, the issuing step issues the electronic revenue stamp as data attached the signature of the electronic revenue stamp issuing apparatus to an issued number (a serial number) of the electronic revenue stamp issuing apparatus to specify the electronic revenue stamp, in addition to the message to be attached to the electronic revenue stamp, the amount of the electronic revenue stamp, and the identifier of the receiver of the electronic revenue stamp.

According to an eighteenth aspect of the present invention, in the fifteenth aspect, the verifying step, when the verifying step receives the certificate making electronic revenue stamp invalid attached the signature of the receiver, verifies whether the certificate making electronic revenue stamp invalid is valid or not by using the identifier of the receiver and an issued number (a serial number) of the electronic revenue stamp issuing apparatus, when the electronic revenue stamp issuing apparatus gives the issued number to the electronic revenue stamp.

According to a nineteenth aspect of the present invention, in the fifteenth aspect, the recording medium stored the control program of the electronic revenue stamp issuing method further provides the step of; storing invalid electronic revenue stamp data that are data of electronic revenue stamps made to be invalid.

According to a twentieth aspect of the present invention, in the fourteenth aspect, the recording medium stored the electronic revenue stamp issuing method further provides the steps of; recording issued electronic revenue stamps, and storing issued electronic revenue stamp data and invalid electronic revenue stamp data made to be invalid when the electronic revenue stamps are made to be invalid.

According to a twenty-first aspect of the present invention in the fifteenth aspect, the verifying step verifies that the certificate making electronic revenue stamp invalid is issued for an electronic revenue stamp issued by the electronic revenue stamp issuing apparatus and also issued by a receiver who is an valid receiver of the electronic revenue stamp, and also verifies that the certificate making electronic revenue stamp invalid was not used before.

According to a twenty-second aspect of the present invention, the recording medium stored the control program of the electronic revenue stamp issuing method is an IC card.

According to the present invention, the electronic revenue stamp issuing apparatus has a function to issue the electronic revenue stamp based on the identifier of the receiver of the electronic revenue stamp. By attaching the identifier of the receiver to the electronic revenue stamp, the receiver can make the received electronic revenue stamp invalid, and the electronic revenue stamp issuing apparatus can be instructed to increase the possible amount to issue by the amount of the invalid electronic revenue stamp. And in order to increase the possible amount to issue by using the certificate making electronic revenue stamp invalid issued by the receiver, the electronic revenue stamp issuing apparatus has a verifying function to verify the validity of the certificate making electronic revenue stamp invalid and the amount increasing function to incrementse the possible amount to issue. With these functions, it can be prevented that the possible amount to issue in the electronic revenue stamp issuing apparatus is illegally increased by an illegal certificate making electronic revenue stamp invalid.

Further, according to the present invention, in order not to increase the possible amount to issue twice by inputting again the certificate making electronic revenue stamp invalid that is verified to be valid, the electronic revenue stamp issuing apparatus has a recording function to record electronic revenue stamps that were made to be invalid and whose amount were increased in the possible amount to issue. Therefore, at the electronic revenue stamp issuing apparatus, the amount of the invalid electronic revenue stamp can be increased in the possible amount to issue, without any communication with the specified communication center.

BRIEF DESCRIPTION OF THE DRAWINGS

The objects and features of the present invention will become more apparent from the consideration of the following detailed description taken in conjunction with the accompanying drawings in which:

FIG. 2 is a block diagram showing a first embodiment of an electronic revenue stamp issuing apparatus of the present invention;

DESCRIPTION OF THE PREFERRED EMBODIMENTS

Figure 1:
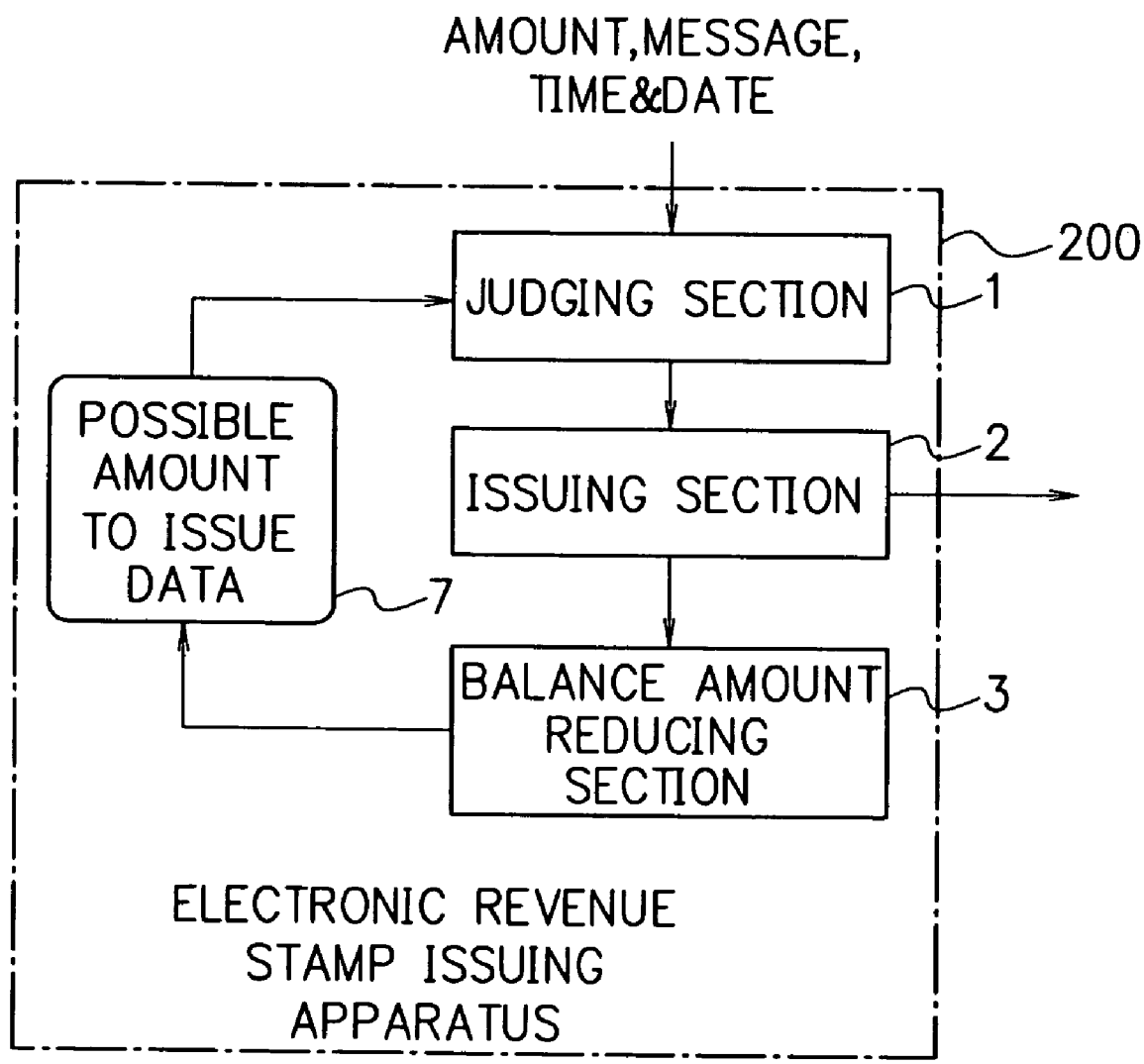
FIG. 1 is a block diagram showing a conventional electronic revenue stamp issuing apparatus.

Referring now to the drawings, in order to make objects, features, and advantages of the present invention clear, embodiments of the present invention are explained in detail. FIG. 2 is a block diagram showing a first embodiment of an electronic revenue stamp issuing apparatus of the present invention. At the first embodiment, a function, which is almost equivalent to the function of the conventional electronic revenue stamp issuing apparatus shown in FIG. 1, has the same reference number that the conventional electronic revenue stamp issuing apparatus has. As shown in FIG. 2, an electronic revenue stamp issuing apparatus 100 of the first embodiment of the present invention provides a judging section 1, an issuing section 2, a receiver 11, a balance amount reducing section 3, a verifying section 4, an amount increasing section 5, and an invalid electronic revenue stamp recording section. 6. And the electronic revenue stamp issuing apparatus 100 controls possible amount to issue data 7, and invalid electronic revenue stamp data 8.

In case of issuing an electronic revenue stamp, data being items to be inputted to the electronic revenue stamp issuing apparatus 100 are the amount of the electronic revenue stamp, a message, an identifier of a receiver of the message (name of the receiver), and a time & date. In case that the electronic revenue stamp is made to be invalid, a certificate making the electronic revenue stamp invalid is inputted to the electronic revenue stamp issuing apparatus 100.

First, the case of issuing the electronic revenue stamp is explained. The data being the amount of the electronic revenue stamp, the message, the identifier of the receiver of the message (name of the receiver), and the time & date are inputted to the judging section 1. The judging section 1 judges whether the amount of the electronic revenue stamp is equal to or less than the possible amount to issue data 7 or not. In case that the amount of the electronic revenue stamp is equal to or less than the possible amount to issue data 7, the inputted data mentioned above are outputted to the issuing section 2. The issuing section 2 calculates a signature by using a secret key for signature (not shown) recorded in the electronic revenue stamp issuing apparatus 100 for the inputted data, and outputs data attached the signature as the electronic revenue stamp. When the electronic revenue stamp is issued, the balance amount reducing section 3 reduces the issued amount of the electronic revenue stamp from the possible amount to issue data 7. With this operation mentioned above, the electronic revenue stamp issuing operation is completed.

The receiver, received the electronic revenue stamp outputted from the electronic revenue stamp issuing apparatus 100, verifies whether the message has a valid signature calculated by the electronic revenue stamp issuing apparatus 100 or not, and in case that the valid signature exists, the receiver acknowledges that the message is a message validly attached the electronic revenue stamp.

Next, operation, in case that the receiver needs to return the electronic revenue stamp due to that the message attached the electronic revenue stamp has some fault, is explained. At this time, the receiver issues a certificate making electronic revenue stamp invalid. The certificate making electronic revenue stamp invalid is an instruction message that has the signature of the receiver to make the electronic revenue stamp invalid. Then, operation to make the electronic revenue stamp invalid is explained by using this certificate making electronic revenue stamp invalid. This certificate making electronic revenue stamp invalid is inputted to the verifying section 4. The verifying section 4 verifies that the electronic revenue stamp is issued by the electronic revenue stamp issuing apparatus 100 by using the signature attached to the electronic revenue stamp.

And the verifying section 4 reads out the identifier of the receiver written in the electronic revenue stamp, and verifies that the identifier of the receiver has been validly given to the certificate making electronic revenue stamp invalid. Further, the verifying section 4 verifies that this electronic revenue stamp has not been made to be invalid before. After these verification mentioned above, the amount increasing section 5 increases the amount by the amount of this electronic revenue stamp. After this, the invalid electronic revenue stamp recording section 6 records that this electronic revenue stamp was made to be invalid. With the operation mentioned above, the operation to make the electronic revenue stamp invalid is completed.

At the first embodiment mentioned above, the data being the amount of the electronic revenue stamp, the message, the identifier of the receiver of the message (name of the receiver), and the time & date with the signature of the electronic revenue stamp issuing apparatus 100 are given to the issued electronic revenue stamp. However, in addition to the data mentioned above, for example, data such as an identifier and an issued serial number of the electronic revenue stamp issuing apparatus 100, and the possible amount to issue data 7 at the time of issuing can be added to the issued electronic revenue stamp with the signature of the electronic revenue stamp issuing apparatus 100. In this, the composing method of the data with the signature is well known, and there is a method to attach a signature to the inputted data by applying a signature conversion to all the inputted data. This method is applied to the first embodiment of the present invention. In addition to the method mentioned above, there are methods such as the signature conversion is applied only to a hashed value of the inputted data, and a part of the inputted data is converted to the hashed value and the signature conversion is applied to the all inputted data including the hashed value.

And by depending on a used signature algorithm, it is not always necessary to attach the inputted data, there is a method that the inputted data can be restored by only using data applied the signature conversion. And it is well known that it is necessary that information of a public key certificate, which is needed to verify the signature of the electronic revenue stamp issuing apparatus at the receiver, has been notified to the receiver. The signature algorithm is well known and not directly related to the present invention, therefore, the explanation of the signature algorithm is omitted.

Figure 3:
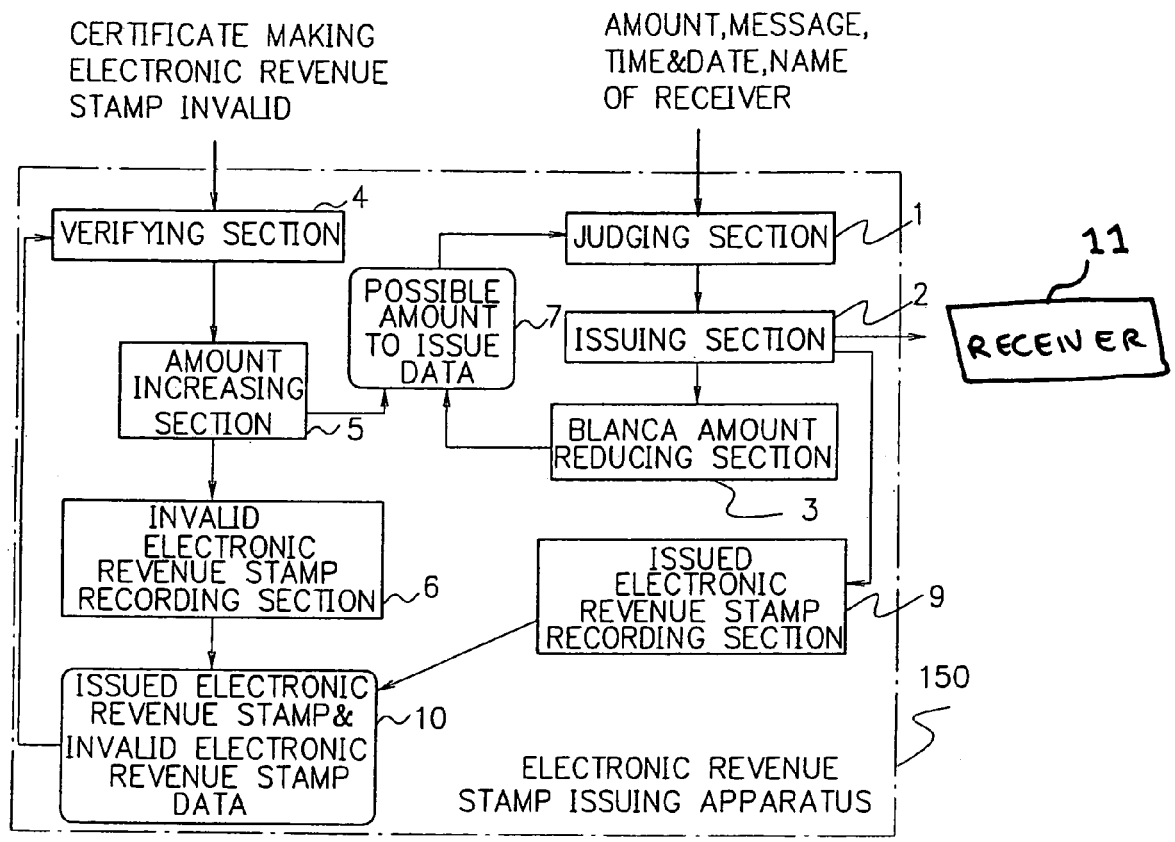
FIG. 3 is a block diagram showing a second embodiment of the electronic revenue stamp issuing apparatus of the present invention.

Next a second embodiment of the electronic revenue stamp issuing apparatus of the present invention is explained in detail. FIG. 3 is a block diagram showing the second embodiment of the electronic revenue stamp issuing apparatus of the present invention. At the second embodiment, a function, which is almost equivalent to the function of the first embodiment shown in FIG. 2, has the same reference number that the first embodiment has. As shown in FIG. 3, an electronic revenue stamp issuing apparatus 150 of the second embodiment of the present invention provides a judging section 1, an issuing section 2, a receiver 11, a balance amount reducing section 3, a verifying section 4, an amount increasing section 5, an invalid electronic revenue stamp recording section 6, and an issued electronic revenue stamp recording section 9. And the electronic revenue stamp issuing apparatus 150 controls possible amount to issue data 7, and issued electronic revenue stamp and invalid electronic revenue stamp data 10.

In case of issuing an electronic revenue stamp, data being items to be inputted to the electronic revenue stamp issuing apparatus 150 are the amount of the electronic revenue stamp, a message, an identifier of a receiver of the electronic revenue stamp (name of the receiver), and a time & date. In case that the electronic revenue stamp is made to be invalid, a certificate making electronic revenue stamp invalid is inputted to the electronic revenue stamp issuing apparatus 150.

First, the case of issuing the electronic revenue stamp is explained. The data being the amount of the electronic revenue stamp, the message, the identifier of the receiver of the electronic revenue stamp (name of the receiver), and the time & date are inputted to the judging section 1. The judging section 1 judges whether the amount of the electronic revenue stamp is equal to or less than the amount in the possible amount to issue data 7 or not. In case that the amount of the electronic revenue stamp is equal to or less than the amount in the possible amount to issue data 7, the inputted data mentioned above are outputted to the issuing section 2. The issuing section 2 obtains a number being a serial number for the electronic revenue stamp, and calculates a signature by using a secret key for signature (not shown) recorded in the electronic revenue stamp issuing apparatus 150 for the inputted data and the serial number, and outputs data attached the signature as the electronic revenue stamp.

When the electronic revenue stamp is issued, the balance amount reducing section 3 reduces the issued amount of the electronic revenue stamp from the possible amount to issue data 7. And the issued electronic revenue stamp recording section 9 records the serial number, the amount, the message, the name of the receiver, and the time & date of the issued electronic revenue stamp. With this operation mentioned above, the electronic revenue stamp issuing operation is completed. The receiver, who received the electronic revenue stamp outputted from the electronic revenue stamp issuing apparatus 150, verifies whether the message has a valid signature calculated by the electronic revenue stamp issuing apparatus 150 or not, and in case that the valid signature exists, the receiver acknowledges that the message is a message validly attached the electronic revenue stamp.

Next, operation, in case that the receiver needs to return the electronic revenue stamp due to that the message attached the electronic revenue stamp has some fault, is explained. At this time, the receiver issues a certificate making electronic revenue stamp invalid. The certificate making electronic revenue stamp invalid is an instruction message that has the signature of the receiver to make the electronic revenue stamp invalid. At the second embodiment, since that the issued electronic revenue stamp and the invalid electronic revenue stamp data 10 are recorded in the electronic revenue stamp issuing apparatus 150, for example, by specifying the electronic revenue stamp used the serial number, the certificate making electronic revenue stamp invalid can be made to be the certificate making electronic revenue stamp invalid with the signature of the receiver.

Then, operation to make the electronic revenue stamp invalid by using this certificate making electronic revenue stamp invalid is explained. This certificate making electronic revenue stamp invalid is inputted to the verifying section 4. The verifying section 4 verifies that the electronic revenue stamp is issued by the electronic revenue stamp issuing apparatus 150 by using the serial number of the electronic revenue stamp attached to the certificate making electronic revenue stamp invalid and the issued electronic revenue stamp and invalid electronic revenue stamp data 10 recorded in the electronic revenue stamp issuing apparatus 150. And the verifying section 4 reads out the identifier of the receiver of the electronic revenue stamp recorded in the issued electronic revenue stamp and invalid electronic revenue stamp data 10, and verifies that the signature of the receiver of the electronic revenue stamp has been validly given to the certificate making electronic revenue stamp invalid.

Further, the verifying section 4 verifies that this electronic revenue stamp has not been made to be invalid before. After these verification mentioned above, the amount increasing section 5 increases the amount by the amount of this electronic revenue stamp. After this, the invalid electronic revenue stamp recording section 6 records that this electronic revenue stamp was made to be invalid. With the operation mentioned above, the operation making the electronic revenue stamp invalid is completed.

At the second embodiment compared with the first embodiment, the inputted all data are not needed to write in the certificate making electronic revenue stamp invalid, and it is enough to write only the serial number specifying the electronic revenue stamp and the signature of the receiver. Therefore, the amount of data of the certificate making electronic revenue stamp invalid can be reduced. Further, it is not necessary to verify the own signature of the electronic revenue stamp issuing apparatus 150 to know that the electronic revenue stamp is issued by his/her own, and it is enough to refer the serial numbers that is managed by him/her. Therefore, the operation can be simplified. On the other hand, the issued electronic revenue stamps must be managed by him/her.

Figure 4:
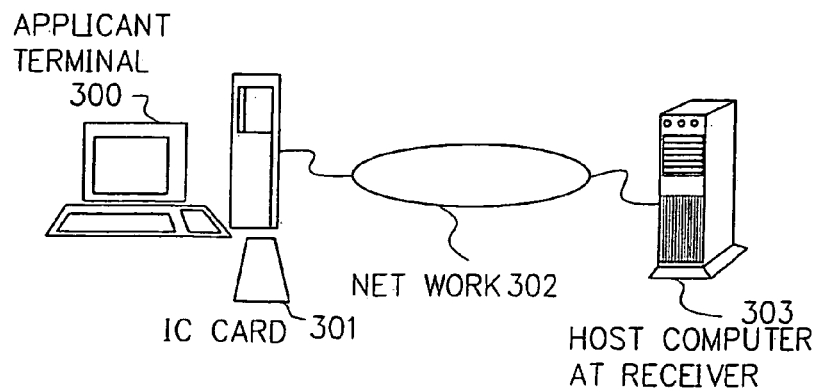
FIG. 4 is a diagram showing a structure of an electronic revenue stamp issuing system used the electronic revenue stamp issuing apparatus of the present invention.

The electronic revenue stamp issuing apparatus of the present invention can be operated by using, for example, an IC card. FIG. 4 is a diagram showing a structure of an electronic revenue stamp issuing system used the electronic revenue stamp issuing apparatus of the present invention. Referring to FIG. 4, the electronic revenue stamp issuing system used the IC card on a network used the electronic revenue stamp issuing apparatus of the present invention is explained.

As shown in FIG. 4, for example, it is explained a case that an applicant wants to send an application message with an electronic revenue stamp to a host computer at receiver 303 through a network 302, by operating an applicant terminal 300 and using an IC card in which a prepaid amount of money is managed. In this case, the applicant makes the application message on the applicant terminal 300 and inputs a required amount for the electronic revenue stamp, the application message, and the name of the receiver to the IC card 301, and instructs to issue the electronic revenue stamp.

Since the functions of the electronic revenue stamp issuing apparatus of the present invention are installed in the IC card 301, as mentioned above, in case that the required amount for issuing the electronic revenue stamp is in the IC card 301, the IC card 301 issues the electronic revenue stamp and notifies the applicant terminal 300. The applicant terminal 300 sends this electronic revenue stamp and the application message to the host computer at receiver 303 through the network 302. The host computer at receiver 303 verifies whether the electronic revenue stamp is valid or not. In case that the application message does not have any fault, the host computer 303 notifies that the application message was accepted to the applicant terminal 300. In case that the application message has some fault, the host computer at receiver 303 notifies that application message was not accepted to the applicant terminal 300, and issues a certificate making electronic revenue stamp invalid for the electronic revenue stamp attached to the application message. The appliacnt terminal 300 notified that the application message has some fault inputs the certificate making electronic revenue stamp invalid sent from the host computer at receiver 303 to the IC card 301. And the applicant terminal 300 instructs the IC card 301 to increase the amount of money by the amount of the electronic revenue stamp used this fault operation by inputting this certificate making electronic revenue stamp to the IC card 301.

As mentioned above, when the functions of the electronic revenue stamp issuing apparatus of the present invention are installed in the IC card 301 and the host computer at receiver 303, in case that the IC card 301 is instructed to increase the amount of money by using the valid certificate making electronic revenue stamp invalid, the amount of money which is made to be invalid can be increased in the IC card 301.

According to the present invention, as mentioned above, the amount of an electronic revenue stamp that became invalid can be used again as the amount of a possible amount to issue data without any communication with a specified communication center.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An electronic revenue stamp issuing apparatus, comprising:
   request means for making a request for issuance of an electronic revenue stamp for a user-determined amount, said user-determined amount being a value or cost of the electronic revenue stamp, said request being made by a receiver;
   debit means for tracking remaining value of a prepaid amount, said prepaid amount being reduced, each time an electronic revenue stamp is issued, by said value or cost of said electronic revenue stamp;

a judging means for judging whether the amount of said electronic revenue stamp to be issued is equal to or less than said prepaid amount;

an issuing means for issuing said electronic revenue stamp as data on a document, said issuing means giving a serial number with said data to said electronic revenue stamp, said data containing a digital signature of said electronic revenue stamp issuing apparatus on a message, said message including the document which said electronic revenue stamp is attached to, the amount of said electronic revenue stamp, and an identifier of a receiver of said electronic revenue stamp, if said amount of said revenue stamp is judged to be equal to or less than said prepaid amount by said judging means;

a balance amount reducing means for reducing said prepaid amount of said debit means by said value or cost of said electronic revenue stamp if said electronic revenue stamp is issued;

a verifying means that is part of the stamp issuing apparatus, for receiving a digital certificate for making an electronic revenue stamp invalid, said digital certificate containing a digital signature of said receiver, and verifying whether said digital certificate is valid or not by using an identifier of said receiver and without communication with a data center;

an amount increasing means for increasing said prepaid amount by an amount equal to the value or cost of said invalidated electronic revenue stamp; and an invalid electronic revenue stamp recording means for recording receipt of said digital certificate.

2. An electronic revenue stamp issuing apparatus in accordance with claim 1, wherein: said issuing means issues an issue number of said electronic revenue stamp issuing apparatus to said electronic revenue stamp, and said message includes said issue number.

3. An electronic revenue stamp issuing apparatus in accordance with claim 1, wherein: said verifying means verifies whether said digital certificate making electronic revenue stamp invalid is valid or not by using said identifier of said receiver and an issue number of said electronic revenue stamp issuing apparatus.

4. An electronic revenue stamp issuing apparatus in accordance with claim 1, further comprising: invalid electronic revenue stamp data for storing data of electronic revenue stamps made to be invalid.

5. An electronic revenue stamp issuing apparatus in accordance with claim 1, further comprising:

an issued electronic revenue stamp recording means which records issued electronic revenue stamps; and storing means for issued electronic revenue stamp data and invalid electronic revenue stamp data.

6. An electronic revenue stamp issuing apparatus in accordance with claim 1, wherein: said verifying means verifies that said digital certificate making electronic revenue stamp invalid is issued for an electronic revenue stamp issued by said electronic revenue stamp issuing apparatus and also issued by a receiver who is a valid receiver of said electronic revenue stamp, and also verifies that said digital certificate making electronic revenue stamp invalid was not used before.

7. An electronic revenue stamp issuing method, comprising the steps of:

requesting issuance of an electronic revenue stamp for a user-determined amount, said user-determined amount being a value or cost of the electronic revenue stamp, said request being made by a receiver;

tracking remaining value of a prepaid amount, said prepaid amount being reduced, each time an electronic revenue stamp is issued, by said value or cost of said electronic revenue stamp;

judging whether the amount of said electronic revenue stamp to be issued is equal to or less than said prepaid amount;

providing an electronic revenue stamp issuing apparatus;

said electronic revenue stamp issuing apparatus issuing said electronic revenue stamp as data on a document and giving a serial number with said data to said electronic revenue stamp, said data containing a digital signature of said electronic revenue stamp issuing apparatus on a message, said message including the document which said electronic revenue stamp is attached to, the amount of said electronic revenue stamp, and an identifier of a receiver of said electronic revenue stamp, if said amount of said revenue stamp is judged by said judging step to be equal to or less than said prepaid amount;

subtracting said amount of said electronic revenue stamp from said prepaid amount if said electronic revenue stamp is issued;

when a digital certificate from said receiver making said electronic revenue stamp invalid containing a digital signature of said receiver is received, verifying through a verification means that is part of the stamp issuing apparatus whether said digital certificate making said electronic revenue stamp invalid is valid or not by using an identifier of said receiver, said verifying step being performed without communicating with a data center;

increasing said prepaid amount by said amount of said invalidated electronic revenue stamp when said verifying step verifies that a valid digital certificate has been received for invalidating said issued electronic revenue stamp; and recording receipt of said digital certificate making an electronic revenue stamp invalid.

8. An electronic revenue stamp issuing method in with claim 7, wherein: said issuing step issues an issue number of said electronic revenue stamp issuing apparatus to said electronic revenue stamp, and said message includes said issue number.

9. An electronic revenue stamp issuing method in accordance with claim 7, wherein: said verifying step verifies whether said digital certificate making electronic revenue stamp invalid is valid or not by using said identifier of said receiver and an issue number of said electronic revenue stamp issuing apparatus.

10. An electronic revenue stamp issuing method in accordance with claim 7, further comprising the step of: storing invalid electronic revenue stamp data that are data of electronic revenue stamps made to be invalid.

11. An electronic revenue stamp issuing method in accordance with claim 7, further comprising the steps of:

recording issued electronic revenue stamps; and storing issued electronic revenue stamp data and invalid electronic revenue stamp data.

12. An electronic revenue stamp issuing method in accordance with claim 7, wherein: said verifying step verifies that said digital certificate making electronic revenue stamp invalid is issued for an electronic revenue stamp issued by said electronic revenue stamp issuing apparatus and also issued by a receiver who is a valid receiver of said electronic revenue stamp, and also verifies that said digital certificate making electronic revenue stamp invalid was not used before.

13. A program storage device readable by machine, tangibly embodying a program of instructions executable by the machine to perform method steps for storing a control program of an electronic revenue stamp issuing method, comprising the steps of:

requesting issuance of an electronic revenue stamp for a user-determined amount, said user-determined amount being a value or cost of the electronic revenue stamp, said request being made by a receiver;

tracking remaining value of a prepaid amount, said prepaid amount being reduced, each time an electronic revenue stamp is issued, by said value or cost of said electronic revenue stamp;

judging whether the amount of said electronic revenue stamp to be issued is equal to or less than said prepaid amount;

providing an electronic revenue stamp issuing apparatus;

said electronic revenue stamp issuing apparatus issuing said electronic revenue stamp as data on a document and giving a serial number with said data to said electronic revenue stamp, said data containing a digital signature of said electronic revenue stamp issuing apparatus on a message, said message including the document which said electronic revenue stamp is attached to, the amount of said electronic revenue stamp, and an identifier of a receiver of said electronic revenue stamp, if said amount of said revenue stamp is judged by said judging step to be equal to or less than said prepaid amount;

subtracting said amount of said electronic revenue stamp from said prepaid amount if said electronic revenue stamp is issued;

when a digital certificate from said receiver making said electronic revenue stamp invalid containing a digital signature of said receiver is received, verifying through a verification means that is part of the stamp issuing apparatus whether said digital certificate making said electronic revenue stamp invalid is valid or not by using an identifier of said receiver, said verifying step being performed without communicating with a data center;

increasing said prepaid amount by said amount of said invalidated electronic revenue stamp when said verifying step verifies that a valid digital certificate has been received for invalidating said issued electronic revenue stamp; and recording receipt of said digital certificate making an electronic revenue stamp invalid.

14. A program storage device readable by machine, tangibly embodying a program of instructions executable by the machine to perform method steps for storing a control program of an electronic revenue stamp issuing method in accordance with claim 13, wherein: said issuing step issues an issue number of said electronic revenue stamp issuing apparatus to said electronic revenue stamp, and said message includes said issue number.

15. A program storage device readable by machine, tangibly embodying a program of instructions executable by the machine to perform method steps for storing a control program of an electronic revenue stamp issuing method in accordance with claim 13, wherein: said verifying step verifies whether said digital certificate making electronic revenue stamp invalid is valid or not by using said identifier of said receiver and an issue number of said electronic revenue stamp issuing apparatus.

16. A program storage device readable by machine, tangibly embodying a program of instructions executable by the machine to perform method steps for storing a control program of a control program of an electronic revenue stamp issuing method in accordance with claim 13, further comprising the step of: storing invalid electronic revenue stamp data that are data of electronic revenue stamps made to be invalid.

17. A program storage device readable by machine, tangibly embodying a program of instructions executable by the machine to perform method steps for storing a control program of an electronic revenue stamp issuing method in accordance with claim 13, further comprising the steps of:

recording issued electronic revenue stamps; and storing issued electronic revenue stamp data and invalid electronic revenue stamp data.

18. A program storage device readable by machine, tangibly embodying a program of instructions executable by the machine to perform method steps for storing a control program of an electronic revenue stamp issuing method in accordance with claim 13, wherein: said verifying step verifies that said digital certificate making electronic revenue stamp invalid is issued for an electronic revenue stamp issued by said electronic revenue stamp issuing apparatus and also issued by a receiver who is a valid receiver of said electronic revenue stamp, and also verifies that said digital certificate making electronic revenue stamp invalid was not used before.

19. A program storage device readable by machine, tangibly embodying a program of instructions executable by the machine to perform method steps for storing a control program of a control program of an electronic revenue stamp issuing method in accordance with claim 13, wherein: said program storage device storing said control program of said electronic revenue stamp issuing method is an IC card.

* * * * *